Dec. 11, 1951     C. R. JOHNSON     2,578,068
COMBINED BUMPER AND GRILLE
Filed Oct. 15, 1948

Clarence R. Johnson
INVENTOR.

Patented Dec. 11, 1951

2,578,068

UNITED STATES PATENT OFFICE 2,578,068

COMBINED BUMPER AND GRILLE

Clarence R. Johnson, Gary, Ind.

Application October 15, 1948, Serial No. 54,702

4 Claims. (Cl. 293—63)

This invention relates to novel and useful improvements in attachments for motor vehicles.

An object of this invention is to combine a front bumper, grill, and bumper and grill guards, if the latter is found desirable.

Another object of this invention is to so support the combined grill and bumper at the forward end of the vehicle that it will be capable of only a small predetermined amount of flexing or pivotal movement upon engagement with an object.

Ancillary objects and features of novelty such as simplicity of structure will become apparent to those skilled in the art, following the description of the preferred form of the invention, illustrated in the accompanying drawings, wherein.

Figure 1:
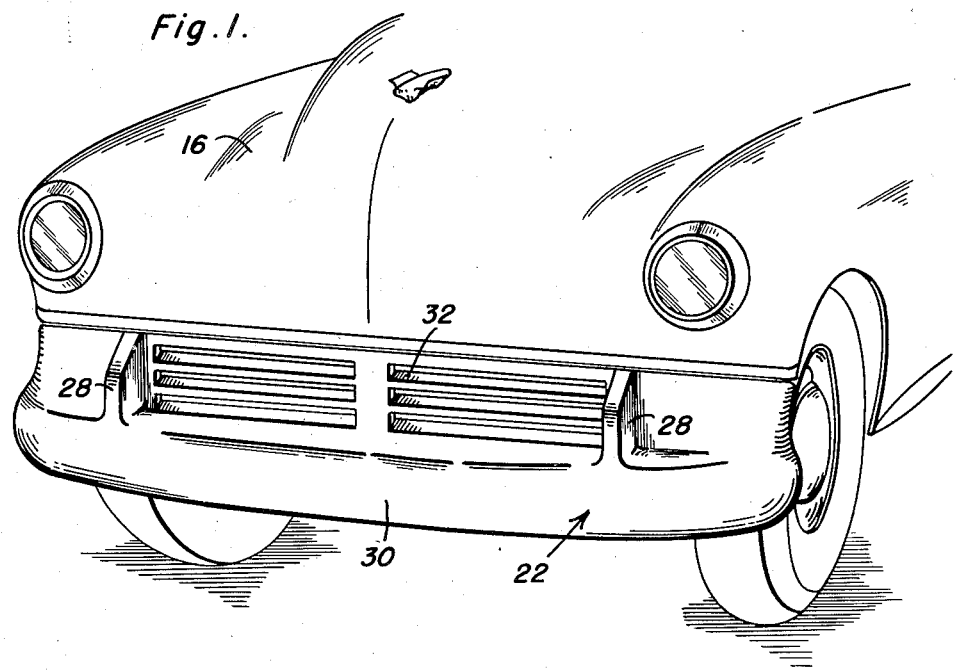
Figure 1 is a perspective view of the preferred form of the invention, the same being associated with a conventional vehicle.
Figure 2:
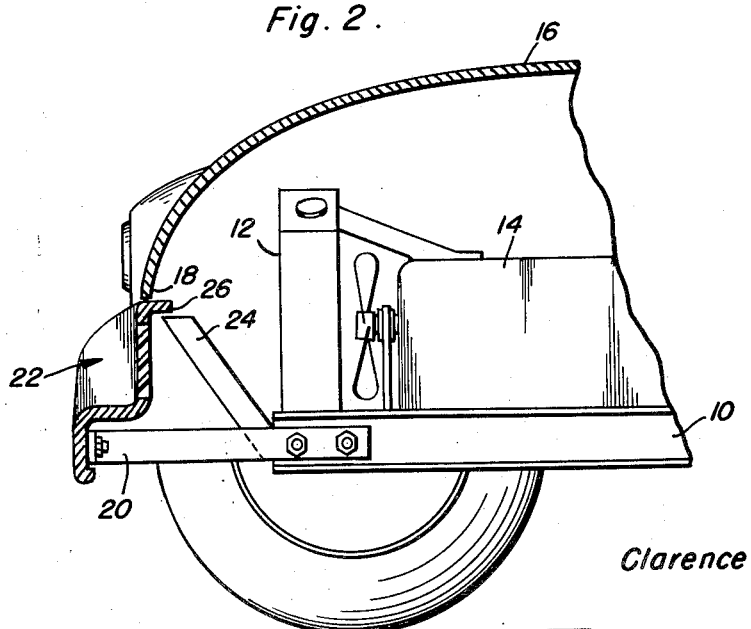
Figure 2 is a sectional view taken longitudinally of the forward portion of the vehicle shown in Figure 1.

The present invention relates to the class of devices which relates to attachments and appurtenances contiguous to automotive vehicles. To this end a conventional chassis 10 is illustrated in Figure 2 and other elements essential to automotive vehicles such as the radiator 12 and engine 14 as shown.

The hood 16 extends to the forward portion of the vehicle, terminating in a substantially straight edge 18 at the lower portion thereof.

A plurality of brackets 20 are attached at their rear end to the chassis 10 and at their forward ends to the combined grill and bumper seen at 22. Attached to the chassis is a number of stops in the form of arms 24 extending at an angle with relation to the horizontal. The arms or stops 24 are adapted for engagement with an inturned flange 26 which is integral with the upper end of the combined grill and bumper. This inturned flange etxends inwardly of the vehicle and engages the stop 24 upon impact of the grill of sufficiency to flex or bend the combined grill and bumper on the braces 20.

If it is found desirable the grill and bumper guard 28 may be formed in the integral casting with the bumper section 30 therebelow and the louver section therebetween.

It is appreciated that wells or recesses may be supplied where it is found desirable in order to accommodate lights such as directional signals and the like.

Due to the extreme simplicity achieved by the present invention, a further description is deemed unnecessary. However, it is apparent that variations may be made without departing from the spirit of the invention.

Having described the invention, what is claimed as new is:

1. For use with an automotive vehicle which has a chassis, a combination bumper and grill, means disposed at the bottom of said combination grill and bumper for attachment to a vehicle, and a stop disposed behind said grill and adjacent the upper edge hereof for preventing flexing movement of said combined bumper and grill beyond a predetermined limit.

2. For use with an automotive vehicle which has a chassis, a combination bumper and grill, means disposed at the bottom of said combination grill and bumper for attachment to a vehicle, and a stop fixed to said chassis, disposed behind and spaced slightly from the upper portion of said combined bumper and grill adapted to be engaged by said grill and bumper for preventing bending of said bumper and grill beyond a predetermined limit.

3. In an automotive vehicle which has a chassis, a bumper comprising a longitudinal member disposed in a substantially horizontal plane and having means located in a horizontal plane rigidly securing said member to said chassis, the improvement which comprises a stop fixed to said chassis at one end and terminating at the other end adjacent but spaced from said longitudinal member, and said stop being disposed at its upper end in a plane spaced from the plane containing the means for attaching said longitudinal member to said chassis.

4. In an automotive vehicle which has a chassis, a bumper, braces rigidly secured to said bumper and said chassis holding said bumper in a substantially fixed position, rigidly secured to said bumper having an inturned flange, and a stop secured at one end to said chassis and terminating at its opposite end in spaced relationship with respect to the flange so that when said bumper is flexed, it is capable of movement a predetermined amount until the flange strikes the stop, thereby impeding further movement.

CLARENCE R. JOHNSON.

REFERENCES CITED

The following references are of record in the file of this patent:

UNITED STATES PATENTS

| Number | Name | Date |
|---|---|---|
| 1,383,470 | Lind | July 5, 1921 |
| 2,074,469 | Haynes | Mar. 23, 1937 |
| 2,191,599 | Valletta | Feb. 27, 1940 |
| 2,193,229 | Exner | Mar. 12, 1940 |
| 2,260,578 | Murray | Oct. 28, 1941 |
| 2,329,874 | Cadwallader et al. | Sept. 21, 1943 |